US011758351B2

(12) United States Patent
Hafeez

(10) Patent No.: US 11,758,351 B2
(45) Date of Patent: *Sep. 12, 2023

(54) DETERMINING GEOLOCATION OF DEVICES IN A COMMUNICATION NETWORK

(71) Applicant: NetScout Systems Texas, LLC, Plano, TX (US)

(72) Inventor: Imran Hafeez, Allen, TX (US)

(73) Assignee: NetScout Systems Texas, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/401,070

(22) Filed: Aug. 12, 2021

(65) Prior Publication Data

US 2023/0046837 A1    Feb. 16, 2023

(51) Int. Cl.
*H04W 4/029* (2018.01)
*H04W 4/021* (2018.01)
*H04B 17/336* (2015.01)
*H04B 17/327* (2015.01)
*H04W 56/00* (2009.01)

(52) U.S. Cl.
CPC .......... *H04W 4/021* (2013.01); *H04B 17/327* (2015.01); *H04B 17/336* (2015.01); *H04W 56/0045* (2013.01)

(58) Field of Classification Search
CPC ......... H04W 4/021; H04W 56/0045; H04B 17/327; H04B 17/336
See application file for complete search history.

(56) References Cited

U.S. PATENT DOCUMENTS 8,254,959 B2    8/2012 Fix et al.
10,863,316 B1 * 12/2020 Tseng ............ G06F 16/9537
(Continued)

FOREIGN PATENT DOCUMENTS

CN       109996168 B    11/2020
CN       112543470 A     3/2021
WO    WO-2020/234902 A1  11/2020

OTHER PUBLICATIONS

WO/2020/036521 A1) discloses an apparatus, devices and methods for performing beam management involving a machine learning model and GPS data. (Year: 2020).*

(Continued)

*Primary Examiner* — Siu M Lee
(74) *Attorney, Agent, or Firm* — Foley & Lardner LLP

(57) ABSTRACT

A machine learning method performed by a communication network monitoring device in which an incoming signaling record is received that includes radio signal attributes from a UE in the cellular communication network. A determination is made as to whether the UE incoming signaling record contains location (GPS) data. If the UE incoming signaling record contains GPS data, a machine learning model is generated for determining a location of future UEs in the communication network utilizing the GPS data and the radio signal attributes from the incoming UE signaling record. And if GPS data is not included in the UE incoming signaling record, then the geolocation for the UE is predicted using machine learning techniques utilizing a previous generated machine learning model as applied to the radio signal attributes from the incoming UE signaling record.

20 Claims, 3 Drawing Sheets

(56) References Cited

U.S. PATENT DOCUMENTS

| | | | |
|---|---|---|---|
| 11,354,524 B1* | 6/2022 | Tang | G06K 7/10366 |
| 2023/0037992 A1* | 2/2023 | Zee | H04W 24/02 |
| 2023/0062443 A1* | 3/2023 | Chakraborty | G06N 20/00 |

OTHER PUBLICATIONS

Claims of U.S. Appl. No. 17/401,059 (Year: 2021).*
NPL (CN 109996168 B, published on Nov. 20, 2020, abstract) (Year: 2020).*
PCT International Search Report and Written Opinion dated Nov. 18, 2022 in International Application No. PCT/US2022/040171.

* cited by examiner

DETERMINING GEOLOCATION OF DEVICES IN A COMMUNICATION NETWORK

FIELD OF THE INVENTION

The disclosed embodiments generally relates to network monitoring devices in communication networks, and more particularly, to using machine learning techniques in network monitoring devices for determining the geolocations of user equipment in cellular communication networks.

BACKGROUND OF THE INVENTION

In existing mobile (cellular) communication systems, network operators typically seek to optimize their network coverage based on measurements compiled during so called drive tests. Specifically, an operator can have a technician drive a vehicle around an area covered by the network using specialist equipment to measure performance from a subscriber's perspective. The equipment typically consists of a special test mobile communications device and a wideband scanner, connected to data logging and analysis equipment such as a portable computer. Some drive test equipment is configured for remote operation, thereby allowing equipment to be placed in fleet vehicles (such as taxis, buses, delivery vehicles or the like), for automatic data collection.

Drive tests typically provide a good source of RF data, in association with related geographic positional information that can be used to identify and resolve coverage problems or the like. However, measurements of a network coverage area can be time-consuming, expensive to perform, and often do not accurately represent the experience of a real pedestrian user, such as a user in a building or at a significant distance from a road.

Accordingly, the 3rd Generation Partnership Project (3GPP) proposed the development of automated solutions, including the involvement of mobile communication devices (User Equipment (UE)) in the field, in order to minimize operator costs, and the environmental impacts, of network deployment and operation. Studies carried out in response to this proposal demonstrated the feasibility of implementing procedures for minimizing the need for drive tests (referred to herein as 'Minimization of Drive Tests' or '(MDT)' procedures, but also known as 'management of UE based network performance measurements'), in which the UE takes measurements for use by the network to improve network optimization and efficiency. More specifically, these studies demonstrated the feasibility of using control plane solutions for acquiring the measurements from devices. This information, together with information available in the radio access network can then be used for coverage optimization purposes.

Typically, a MDT capable UE is initially configured to perform MDT measurements by the network. On configuration, the MDT capable UE sends detailed user location information including, for example, GPS (Global Positing System) data and/or Radio Frequency fingerprints, along with the reported UE measurements, when requested to do so by the network. This detailed user location information is particularly useful for MDT as it allows an operator to accurately associate the geographical location of the user, within a particular radio cell, with the associated radio measurements; thereby allowing network coverage issues (e.g. coverage holes) to be located accurately.

It is to be understood that the MDT data reported from UEs may thus be used to monitor and detect different kinds of coverage problems in the network including, for example a coverage hole, which is an area where the signal level of both serving and allowed neighbor cells is below the level needed to maintain basic service. Coverage holes are usually caused by physical obstructions such as new buildings, hills, or by unsuitable antenna parameters, or just inadequate RF planning. In this case, a UE in coverage hole will suffer from a call drop and radio link failure. And another network coverage problem is weak coverage that occurs when the signal level of a serving cell is below the level needed to maintain a planned performance requirement (e.g. the cell edge bit-rate).

Thus, it is highly desirable that accurate geographical location data be obtained determine the position of these coverage problems, and thereby enable the requisite action to address them.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

The present illustrated embodiments seeks to provide an improved communication system, and associated improved network communication devices and methods performed by such devices to provide accurate geographical location data from UEs in a cellular communication system to determine coverage problems in the cellular communication system utilizing acquisition of radio measurements and location information from a UE.

To achieve these and other advantages and in accordance with the purpose of the illustrated embodiments, in one aspect, a machine learning method is performed by a communication network monitoring device to determine a geolocation of user equipment (UE) communicatively coupled to a cellular communication network is described in which an incoming signaling record is received in the network monitoring device. The incoming signaling record includes radio signal attributes from a UE in the cellular communication network. A determination is made as to whether the UE incoming signaling record contains Global Positioning Signaling (GPS) data (such as may be embodied in a Minimization of Drive Test (MDT) data record included in the incoming signaling record). If the UE incoming signaling record contains GPS data, a machine learning model is generated for determining a location of future UEs in the communication network preferably utilizing the GPS data and the radio signal attributes from the incoming UE signaling record. And if GPS data is not included in the UE incoming signaling record, then the geolocation for the UE is predicted using machine learning techniques utilizing a previous generated machine learning model as applied to the radio signal attributes from the incoming UE signaling record.

In further, optional aspects, prior to predicting/determining the geolocation for the UE, a determination is made as to whether a previous generated machine learning model exists that is relevant for the radio signal attributes for the UE incoming signaling record such that the geolocation for the UE is only predicted/determined if it is determined a machine learning model exists that is relevant for the radio signal attributes for the UE incoming signaling record. Yet further optional aspects includes when determining if the UE incoming signaling record contains Global Positioning Signaling (GPS) data, a determination is made as to whether the UE incoming signaling record includes a MDT data record after which a location accuracy of the MDT data record is validated such that the machine learning model is only generated upon validation of the MDT data record.

BRIEF DESCRIPTION OF THE DRAWINGS

The accompanying appendices and/or drawings illustrate various non-example, inventive aspects ill accordance with the present disclosure.

DETAILED DESCRIPTION OF CERTAIN EMBODIMENTS

Figure 1:
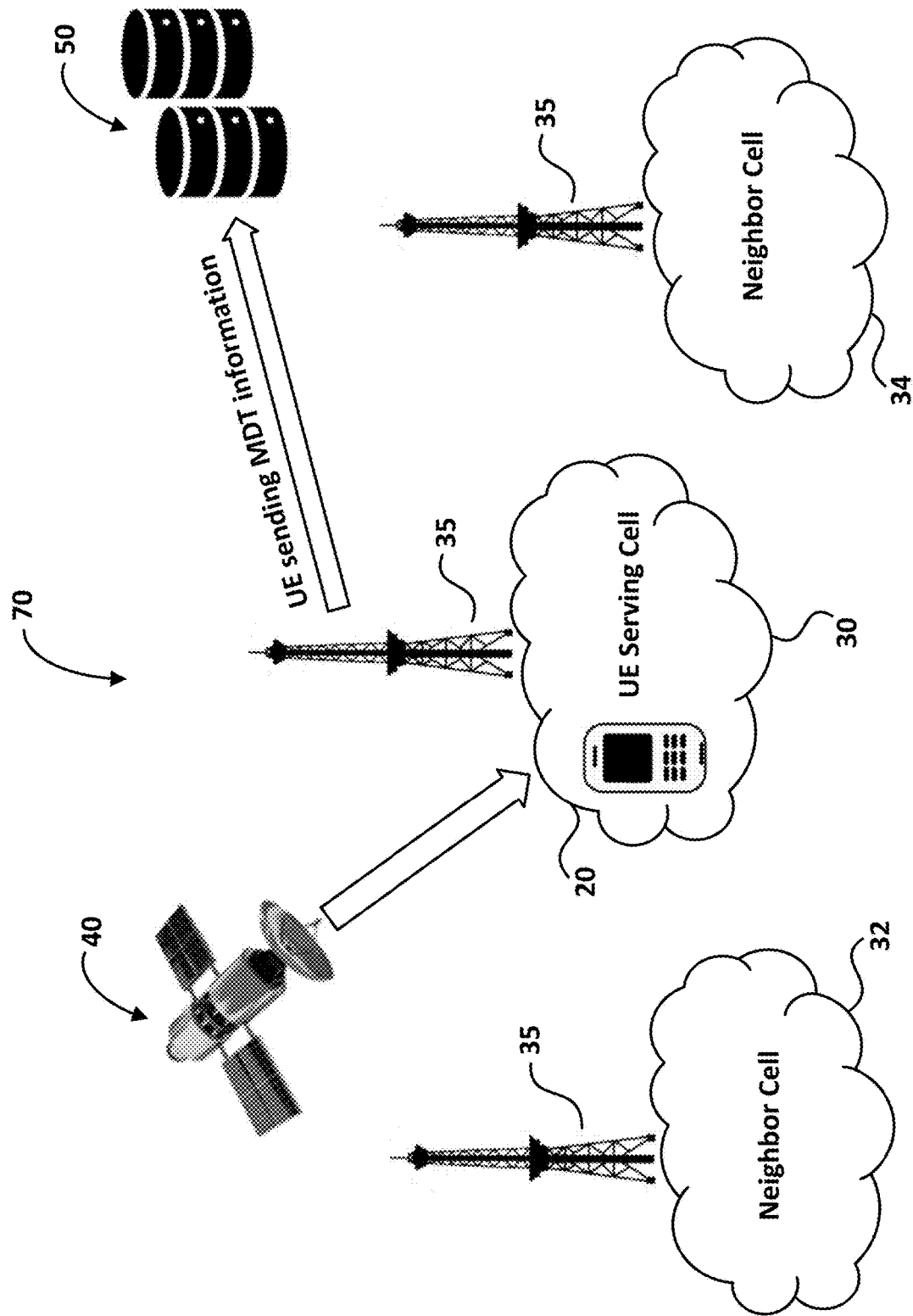
FIG. 1 illustrates, in simplified overview, a generalized communication system.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

FIG. 1 schematically illustrates a mobile (cellular) communication system designated generally at 10, in which users of a plurality of mobile communication devices (also referred to herein as user equipments (UEs)) 20 can communicate with other users (not shown) via a suitable cellular radio network such as a UMTS radio access network (UTRAN), or an LTE radio access network (E-UTRAN) and a respective network core in the case of the UTRAN and Evolved Packet Core (EPC) in the case of the E-UTRAN for example. It is also to be appreciated that the illustrated embodiments may also be used in conjunction with a 5G cellular network.

As one skilled in the art would readily recognize, the communication system 10 includes a plurality of radio access networks (RAN) 30-34, each including a respective base station 35. For instance, the base station 35 of a UTRAN radio access network comprises a so called 'NodeB' and the base station 35 of the E-UTRAN radio access network comprises a so called 'eNodeB' (eNodeB). The UTRAN base station 35 further includes typically a Radio Network Controller (RNC). With regard to an E-UTRAN radio access network, the radio network control functionality of the E-UTRAN is integrated typically with the base station functionality in the eNodeB 30. For sake of simplicity the communication system 10 is shown in FIG. 1 to only include three RANs (30-34), however one skilled in the art readily recognizes the communication includes any number of suitable RANs.

It is to be appreciated that the UE devices 20 of the communication system 10 employ MDT procedures for minimizing drive test requirements in which selected UEs 20 (typically 1-3% of all UEs in the communication system 10) acquire appropriate GPS location measurements and data from a GPS system 40 and report them to the network 10 with, where appropriate, associated location information (e.g., GPS data).

In accordance with the preferred embodiments, communicatively coupled to the cellular communication system 10 is a communication network monitoring system 50, such as the TrueCall® system commercially available from NetScout. The network monitoring system is preferably operable and configured to monitor incoming signaling call records from UEs 20 in the communication network 10 to provide enriched and actionable Radio Access Network (RAN) data which may be utilized to diagnose network and UE problems in real-time, understand demand density and usage, support traffic pattern analysis for network capacity planning, geolocate dropped calls, minimize drive testing and gain an end-to-end view from the radio network to the IP Multimedia Subsystem (IMS) core. In particular, the TrueCall® network monitoring system 50 TrueCall® provides real-time analysis of data originating in the RANs 30-34. The data is enriched using TrueCall's advanced geolocation algorithm, and correlated with subscriber and device data enabling insight into the performance of the RANs 30-34 by combining critical dimensions of a RAN 30 operation in a single location, as further discussed herein. Exemplary features and functionality of the TrueCall® network monitoring system 50 include (but are not limited to): diagnose network and device problems in real-time; identify demand density and drill down to map usage; study traffic patterns; and geolocate calls and minimize drive testing as discussed herein with reference to the described illustrated embodiments.

It is to be appreciated that a UEs 20 incoming signaling record 55 having radio signal attributes of the UE is received and monitored by the network monitoring system 50. Such an incoming signaling call record may include one or more of the following: a Timing Advance (TA) signal; a Minimization of Drive Test (MDT) data record; a signal strength value of a serving eNodeB (cell) 30 for a UE 20 (e.g., a Reference Signal Received Power (RSRP) signal value); a signal quality value of a serving eNodeB (cell) for a UE 20 (e.g., a Reference Signal Received Quality (RSRQ) signal value); a signal strength value of a neighboring cell 32 relative to the serving eNodeB (cell) 30 for a UE 20; and a signal quality value of a neighboring cell 32 relative to the serving eNodeB (cell) 30 for a UE 20.

It is to be understood the TA signal value in a cellular communication system 10 corresponds to the length of time a signal takes to reach a base station 35 from a communicating UE mobile phone 20. For instance, a Global System for Mobile (GSM) uses Time-division multiple access (TDMA) technology in the radio interface to share a single frequency between several users, assigning sequential timeslots to the individual users sharing a frequency. Each user transmits periodically for less than one-eighth of the time within one of the eight timeslots. Since the users are at various distances from the base station and radio waves travel at the finite speed of light, the precise arrival-time within the slot can be used by the base station to determine the distance to the mobile phone. The time at which the phone is allowed to transmit a burst of traffic within a timeslot must be adjusted accordingly to prevent collisions with adjacent users. Timing Advance (TA) is the variable controlling this adjustment. It is to be appreciated that Timing Advance is significant for privacy and communications security, as its combination with other variables can allow GSM localization to find the device's position and track the mobile phone user. TA may also used to adjust transmission power in space-division multiple access systems.

Figure 2:
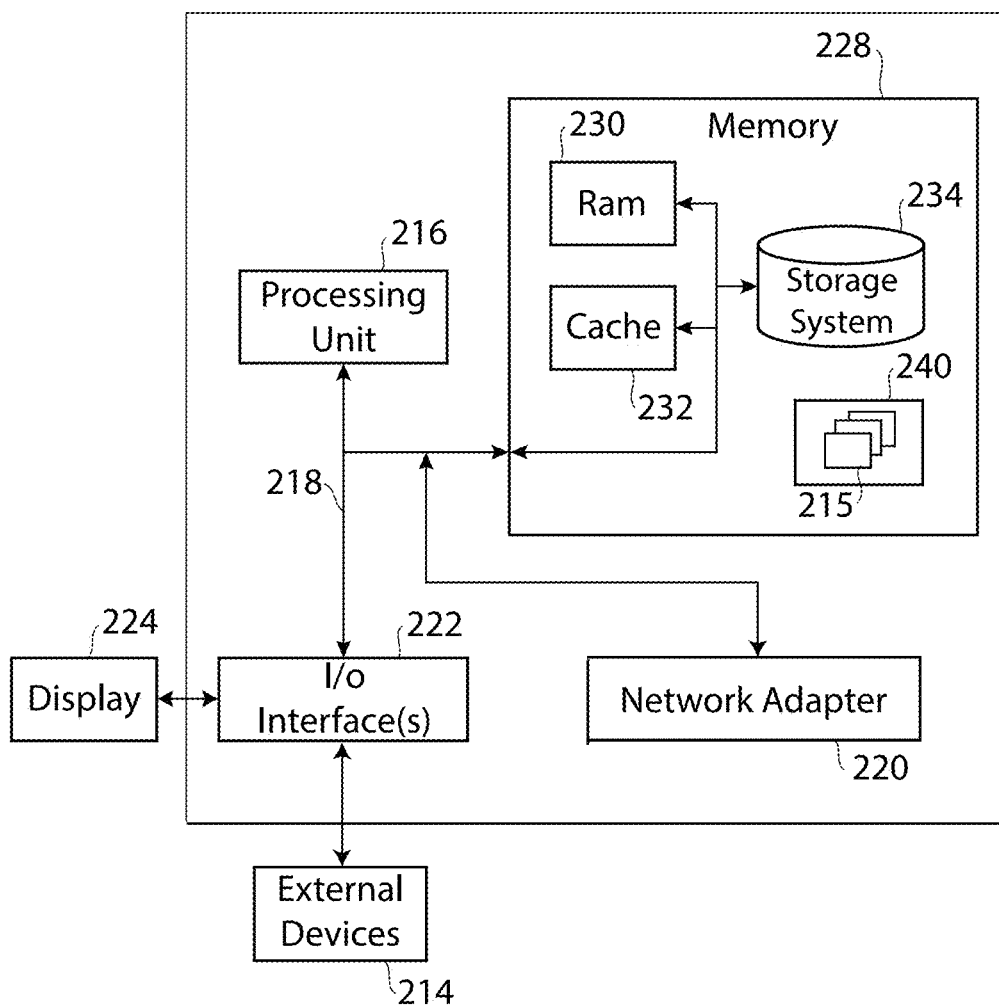
FIG. 2 illustrates an example network monitoring device in the generalized communication system of FIG. 1.

With regard to the network monitoring system 50, FIG. 2 is a schematic block diagram of an example computing device 200 used in the network monitoring system 50 that may be used (or components thereof) with one or more embodiments described herein. Device 200 is intended to represent any type of computer system capable of carrying out the teachings of various embodiments of the embodiments illustrated herein. Device 200 is only one example of a suitable system and is not intended to suggest any limitation as to the scope of use or functionality of embodiments described herein. Regardless, computing device 200 is capable of being implemented and/or performing any of the functionality set forth herein.

Computing device 200 is operational with numerous other special purpose computing system environments or configurations. Examples of well-known computing systems, environments, and/or configurations that may be suitable for use with computing device 200 include, but are not limited to, personal computer systems, server computer systems, thin clients, thick clients, multiprocessor systems, microprocessor-based systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 as shown in FIG. 2 may include, but is not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), a cellular communication system 10 and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary cellular communication network 10 (FIG. 1) and computing device 200 (FIG. 2) being generally shown and discussed above, description of certain illustrated embodiments will now be provided. In understanding and appreciating the illustrated embodiments, it is to be understood geolocation (GL) is an important aspect of the diagnostics performed by a network monitoring system 50, which has traditionally been performed using heuristic mathematical models and formulas. It is thus to be appreciated that performing geolocation of UEs using machine learning (MLGL) is a novel technique, which in accordance with the illustrated embodiments preferably uses datasets from Minimize Drive Test (MDT) data so as to leverage certain radio metrics to predict/determine accurate location of the mobile users (UE 20) via machine learning (ML) algorithms. As demonstrated herein, this approach produces improved accurate results compared to prior heuristic mathematical techniques. As described in accordance with the embodiments illustrated herein, either signal stage or two stage passes of MDT data are utilized to predict/determine the mobile location of a UE 20 in a communication system 10 providing improved accuracy of the determined location.

It is to be appreciated that ML techniques are typically utilized for analyzing complex and large data sets (e.g., MDT) to understand the underlying relationships, that once understood can be used to do all sorts of application work including prediction for future results. As one skilled in the art appreciates, ML typically requires research and analysis on a dataset to apply the algorithms in a methodology to reveal correct results.

In particular, it is to be appreciated and understood that MDT data provides "radio signal attributes" along with precise geo-location information. However, such MDT data constitutes generally only 1-3% of the monitored traffic in a cellular communication system 10, however, in accordance with the illustrated embodiments, this is nevertheless sufficient to leverage ML algorithms for MLGL. It is noted radio signal attributes are unique for a cell site (e.g., 30) along with the physical location such as buildings in a downtown area or trees in a rural area, or a combination of later in an urban environment. As to be described below, these attributes are then used in supervised ML algorithms executing on a computing device 200 in the network monitoring system 50 to generate models for each serving cell (e.g., 30) using MDT data.

In accordance with an illustrated embodiment, in a two stage technique, a "timing advance (TA) correction model" is created (e.g, TA is adjusted and is called as Machine Learning Timing Advance (MLTA)), which is then processed by a succeeding next "Geo prediction model" along with other radio signal attributes. These succeeding models are thus utilized to predict the geolocation of a UE 20 in a communication network 10 when MDT data is not present in an incoming signaling record associated with the UE 10, which as noted above is a majority of the time. It is to be appreciated that new MDT data is continuously evaluated by the network monitoring system 50 for UEs 20 present in the communication system 10 such that the aforesaid models are adjusted accordingly. For instance, new MDT data might reveal changing radio signal attributes due to changed physical attributes such as a new building, tree and/or other obstructions, and thus is continuously integrated into the models. Additionally, in accordance with another illustrated embodiment, and as also described below, a single stage technique is employed utilizing MDT data to predict a location of a UE 20 in a communication system 10.

Figure 3:
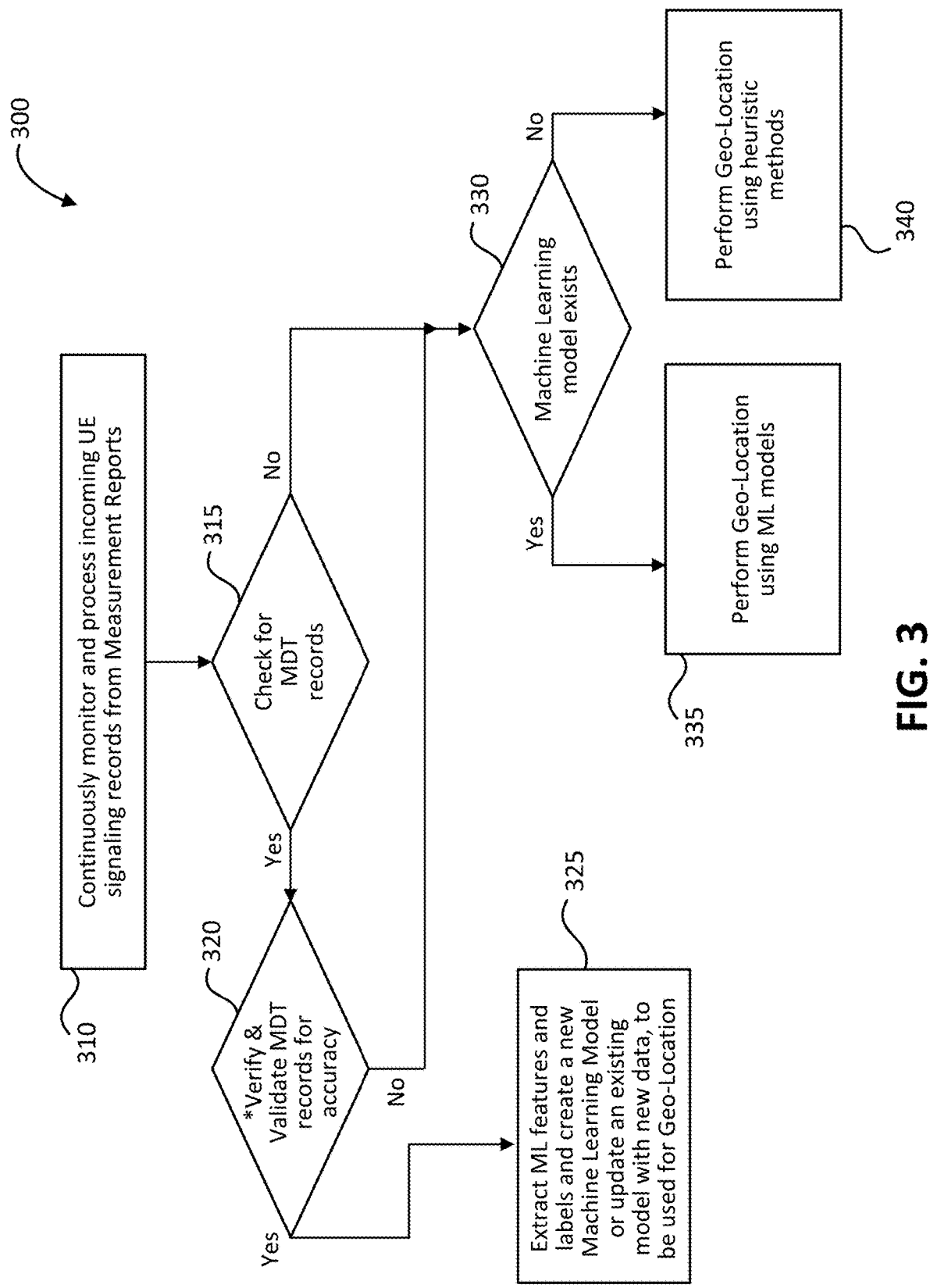
FIG. 3 illustrates a flow chart depicting a method of operation for a network monitoring device.

With reference now to FIG. 3, shown is a flow chart demonstrating implementation of the ML process 300 for the aforementioned exemplary single and two stage ML embodiments utilizing MDT data to predict a UEs 20 geolocation in a cellular communication system 10 preferably in a network monitoring device 50. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 310, received and monitored preferably in the network monitoring system 50 is an incoming signaling record from a UE 10 communicatively coupled in the cellular commination network 10 (e.g., an LTE system) which incoming signaling record includes radio signal attributes associated with the UE 10. As mentioned above, such radio signaling attributes may include (and are not to be understood to be limited to): a Timing Advance (TA) signal; a Minimization of Drive Test (MDT) data record; a signal strength value of a serving eNodeB (cell) 30 for a UE 20 (e.g., a Reference Signal Received Power (RSRP) signal value); a signal quality value of a serving eNodeB (cell) for a UE 20 (e.g., a Reference Signal Received Quality (RSRQ) signal value); a signal strength value of a neighboring cell 32 relative to the serving eNodeB (cell) 30 for a UE 20; and a signal quality value of a neighboring cell 32 relative to the serving eNodeB (cell) 30 for a UE 20.

Next, at step 315 a determination is preferably made as to whether the aforesaid incoming signaling record includes MDT data records. If it is determined MDT data records are included in the received incoming signaling record of the UE 10, then at step 320 the MDT data records are preferably verified and validated for GPS accuracy. This preferably includes: ensuring the GPS latitude and longitude fields are present with valid ranges (e.g., have not been corrupted); ensuring the MDT accuracy fields are present with an accuracy according to a threshold range (e.g., 1 to 100 meters); and/or ensuring the MDT speed field is present, and preferably with a positive range. If the MDT data records are verified/validated in step 320, then in step 325 a geolocation machine learning model is generated for determining/predicating a location of future UEs in the cellular communication network 10 by preferably extracting certain ML features and labels from the MDT data record and radio signal attributes from the aforesaid incoming signaling record of the UE 10. For instance, the illustrated embodiments may utilize machine learning libraries (such as Scikit-learn, pandas, numpy, and other suitable like libraries) for creating the ML models, which are then preferably stored in a ML database. Once stored, the ML models are then retrieved for results predication (e.g., predication/determination of geolocation coordinates). And in the event a ML model was previously created for the aforesaid MDT data record and radio signal attributes from the aforesaid incoming signaling record of the UE 10 attributable to a given cell (30-34), then such an existing ML updated with the new records (e.g., MDT data record and radio signal attributes from the aforesaid incoming signaling record of the UE 10) for a given cell (30-34).

If at step 315 MDT data records were not determined present in the incoming signaling record of the UE 10, or if at step 320 the MDT data records could not be verified/validated, then at step 330 a determination is preferably made as to whether a ML model (as previously generated in step 325) exists that is determined relevant for the signal attributes contained in the incoming signaling record for the UE 10 for determining/predicting the geolocation of the UE 10 using ML techniques utilizing ML models previously generated in step 325. For instance, this determination includes ensuring the GPS latitude and longitude fields are present with valid ranges (e.g., have not been corrupted); ensuring the MDT accuracy fields are present with an accuracy according to a threshold range (e.g., 1 to 100 meters); and/or ensuring the MDT speed field is present, and preferably with a positive range.

If at step 330 it is determined that one or more ML model exists determined relevant for the signal attributes contained in the incoming signaling record for the UE 10, then in accordance with a single stage process the geo coordinates for the UE 10 are predicted by applying the call/radio signal attributes (e.g., a Timing Advance (TA) signal; a signal strength/quality value of a serving eNodeB (cell) 30 for a UE 20; and a signal strength/quality value of a neighboring cell 32 relative to the serving eNodeB (cell) 30 for a UE 20) and any MDT data records present in the received incoming signaling record for the UE 10 (step 310) to the determined relevant previously generated ML model so as to predict the geo location coordinates for the UE 20 using ML techniques by preferably invoking the prediction functionality of the aforementioned saved ML models.

And in accordance with the aforementioned two stage process, first a corrected TA value for the TA value included in the incoming signaling record for the UE 20 is determined. This is preferably performed by applying the call/radio signal attributes (e.g., a Timing Advance (TA) signal; a signal strength/quality value of a serving eNodeB (cell) 30 for a UE 20; and a signal strength/quality value of a neighboring cell 32 relative to the serving eNodeB (cell) 30 for a UE 20) present in the received incoming signaling record for the UE 10 (step 310) to the determined relevant previously generated ML model so as to predict a corrected TA value for the UE 20 using ML techniques. After the corrected TA value for the UE 20 using ML techniques is predicted, then in a second succeeding stage the geolocation coordinates for the UE 10 are predicted by applying aforesaid predicted corrected TA value together with other the call/radio signal attributes (e.g., a signal strength/quality value of a serving eNodeB (cell) 30 for a UE 20; and a signal strength/quality value of a neighboring cell 32 relative to the serving eNodeB (cell) 30 for a UE 20) present in the received incoming signaling record for the UE 10 (step 310) to the determined relevant previously generated ML model so as to predict the geolocation location coordinates for the UE 20 using ML techniques by preferably invoking the prediction functionality of the aforementioned saved ML models.

And if at step 330 it was determined that one or more ML models did not exist determined relevant for the signal attributes contained in the incoming signaling record for the UE 10, then at step 340 the geolocation coordinates for the UE is preferably determined utilizing prior known "fixed/mathematical" methodology using heuristic methods. It is to be appreciated that such utilization of such prior heuristic methods provide decreased accuracy relative to the accuracy of the geolocation coordinates as determined/predicted for the UE 20 in step 335 utilizing the aforementioned ML techniques.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

Thus, it is to be appreciated that what has been described above is determining geolocation coordinates using machine learning (ML) techniques, which is in contrast to the prior "fixed/mathematical" methodology using heuristic methods, wherein the ML approach is adaptable to each cell site 30-34. In other words, each cell site 30-34 preferably has unique radio and cell site attributes which over a period of time changes, (e.g., new buildings are constructed or tree growth, thus obstructing the radio signals) thus creating new radio patterns. This results in changed MDT data, however the models for each cell 30-34 are also adapted in real time, which was not possible with the prior known "fixed/mathematical" methodology using heuristic methods.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A machine learning method performed by a communication network monitoring device to determine a geolocation of user equipment (UE) communicatively coupled to a cellular communication network, comprising the steps:
receiving an incoming signaling record having radio signal attributes from a UE in the cellular communication network;
determining if the UE incoming signaling record contains Global Positioning Signaling (GPS) data;
responsive to determining the UE incoming signaling record contains GPS data, generating a machine learning model for determining a location of future UE in the communication network utilizing the GPS data and the radio signal attributes from the incoming UE signaling record, and
responsive to determining the UE incoming signaling record does not contain GPS data, determining a geolocation for the UE using machine learning utilizing a previous generated machine learning model and the radio signal attributes from the incoming UE signaling record.

2. The machine learning method as recited in claim 1, wherein prior to determining the geolocation for the UE, a determination is made as to whether the previous generated machine learning model exists that is relevant for the radio signal attributes for the UE incoming signaling record whereby the determining the geolocation for the UE is only performed if it is determined a machine learning model exists that is relevant for the radio signal attributes for the UE incoming signaling record.

3. The machine learning method as recited in claim 1, wherein the radio signal attributes includes a Timing Advance (TA) value.

4. The machine learning method as recited in claim 3, wherein determining if the UE incoming signaling record contains Global Positioning Signaling (GPS) data includes first determining whether the UE incoming signaling record includes a Minimization of Drive Test (MDT) data record and then validating a location accuracy of the MDT data record whereby the machine learning model is only generated if the location accuracy of the MDT data record was validated.

5. The machine learning method as recited in claim 4, wherein the GPS data and the radio signal attributes are embodied in the Minimization of Drive Test (MDT) data record.

6. The machine learning method as recited in claim 5, wherein the radio signal attributes include a signal strength value of a serving eNodeB for the UE.

7. The machine learning method as recited in claim 6, wherein the signal strength value consists of a Reference Signal Received Power (RSRP) signal value.

8. The machine learning method as recited in claim 4, wherein the radio signal attributes further include a signal quality value of a serving eNodeB for the UE consisting of a Reference Signal Received Quality (RSRQ) signal value.

9. The machine learning method as recited in claim 6, wherein the radio signal attributes further include a signal strength value of a neighboring eNodeB relative to the serving eNodeB.

10. The machine learning method as recited in claim 9, wherein the radio signal attributes further includes a signal quality value of a neighboring eNodeB relative to the serving eNodeB.

11. The machine learning method as recited in claim 1, wherein the cellular communication network is a Long Term Evolution (LTE) network.

12. A communication network monitoring device for determining a geolocation of user equipment (UE) communicatively coupled to the cellular communication network utilizing machine learning, comprising:
a memory configured to store instructions;
a processor disposed in communication with said memory, wherein said processor upon execution of the instructions is configured to:
receive an incoming signaling record having radio signal attributes from a UE in the cellular communication network;
determine if the UE incoming signaling record contains Global Positioning Signaling (GPS) data;
responsive to a determination that the UE incoming signaling record contains GPS data, generate a machine learning model for determining a location of future UE in the communication network utilizing the GPS data and the radio signal attributes from the incoming UE signaling record; and
responsive to a determination that the UE incoming signaling record does not contain GPS data, determine a geolocation for the UE using machine learning utilizing a previous generated machine learning model and the radio signal attributes from the incoming UE signaling record.

13. The machine learning method as recited in claim 12, wherein the processor is further configured to, and prior to determining the geolocation for the UE, determine whether a previous generated machine learning model exists that is relevant for the radio signal attributes for the incoming UE signaling record whereby the determining the geolocation for the UE is only performed if it is determined a machine learning model exists that is relevant for the radio signal attributes for the incoming UE signaling record.

14. The communication network monitoring device as recited in claim 12, wherein the radio signal attributes includes a Timing Advance (TA) value.

15. The communication network monitoring device as recited in claim 13, wherein determining if the UE incoming signaling record contains Global Positioning Signaling (GPS) data includes first determining whether the UE incoming signaling record includes a Minimization of Drive Test (MDT) data record and then validating a location accuracy of the MDT data record whereby the machine learning model is only generated if the location accuracy of the MDT data record was validated.

16. The communication network monitoring device as recited in claim 15, wherein the GPS data and the radio signal attributes are embodied in the Minimization of Drive Test (MDT) data record.

17. The communication network monitoring device as recited in claim 16, wherein the radio signal attributes include a signal strength value of a serving eNodeB for the UE consisting of a Reference Signal Received Power (RSRP) signal value.

18. The communication network monitoring device as recited in claim 17, wherein the radio signal attributes further include a signal quality value of a serving eNodeB for the UE consisting of a Reference Signal Received Quality (RSRQ) signal value.

19. The communication network monitoring device as recited in claim 16, wherein the radio signal attributes further include: 1) a signal strength value of a neighboring eNodeB relative to a serving eNodeB; and 2) a signal quality value of a neighboring eNodeB relative to the serving eNodeB.

20. The communication network monitoring device as recited in claim 12, wherein the cellular communication network is a Long Term Evolution (LTE) network.

\* \* \* \* \*